United States Patent
Förstler et al.

(10) Patent No.: US 11,950,344 B2
(45) Date of Patent: Apr. 2, 2024

(54) WIRELESS COMMISSIONING SYSTEM FOR DALI DEVICES

(71) Applicant: Tridonic GmbH & Co KG, Dornbirn (AT)

(72) Inventors: Harry Förstler, Netstal (CH); Youssouf Coulibaly, Ennenda (AT); Huang Pengcheng, Zürich (CH); Thomas Kuch, Richterswil (CH); Hans Schlumpf, Schänis (CH); John Schönberger, Altendorf (CH); Vladimir Barkovskii, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 52 days.

(21) Appl. No.: 17/627,750

(22) PCT Filed: Aug. 17, 2020

(86) PCT No.: PCT/EP2020/072964
§ 371 (c)(1),
(2) Date: Jan. 17, 2022

(87) PCT Pub. No.: WO2021/043565
PCT Pub. Date: Mar. 11, 2021

(65) Prior Publication Data
US 2022/0264731 A1    Aug. 18, 2022

(30) Foreign Application Priority Data
Sep. 6, 2019  (EP) ..................... 19196004

(51) Int. Cl.
*H05B 47/19* (2020.01)
*H04W 4/80* (2018.01)
(Continued)

(52) U.S. Cl.
CPC .............. *H05B 47/19* (2020.01); *H04W 4/80* (2018.02); *H05B 47/155* (2020.01); *H05B 47/18* (2020.01)

(58) Field of Classification Search
CPC ...... H05B 47/18; H05B 47/19; H05B 47/155; H04W 4/80
See application file for complete search history.

(56) References Cited

U.S. PATENT DOCUMENTS

2017/0156195 A1* 6/2017 Shepherd ............... H05B 35/00
2017/0359884 A1* 12/2017 Hidaka ............... G06F 3/04817

FOREIGN PATENT DOCUMENTS

| DE | 102018202965 |    | 8/2019 |           |
|----|--------------|----|--------|-----------|
| DE | 102018202965 | A1 * | 8/2019 | ............. H05B 47/18 |

OTHER PUBLICATIONS

DE102018202965A1 Machine Translation. (Year: 2019).*
PCT/EP2020/072964, International Search Report and Written Opinion dated Oct. 27, 2020, 10 pages.

* cited by examiner

*Primary Examiner* — Alexander H Taningco
*Assistant Examiner* — Pedro C Fernandez
(74) *Attorney, Agent, or Firm* — Andrus Intellectual Property Law, LLP

(57) ABSTRACT

The invention relates to an apparatus (1) for controlling DALI devices (2 . . . 4) of a DALI lighting system, comprising an interface (8) for connecting the apparatus (1) to a DALI-bus (5) of said DALI lighting system; controlling means (9) for detecting and addressing the DALI devices (2 . . . 4) connected to the DALI-bus; storage means (10) for storing addresses of the DALI devices (2 . . . 4) generated by the controlling means (9) and device type information of each DALI device (2 . . . 4) detected by the controlling means (9); and Bluetooth transmitter (11) for transmitting (Continued)

the addresses and the device type information to a mobile commissioning device (6) and for receiving configuration information defining behavior of the DALI devices (2 . . . 4) from the mobile commissioning device (6), wherein the controlling means is adapted to configure to the DALI devices (2 . . . 4) based on the configuration information.

18 Claims, 10 Drawing Sheets

(51) Int. Cl.
    *H05B 47/155*     (2020.01)
    *H05B 47/18*     (2020.01)

WIRELESS COMMISSIONING SYSTEM FOR DALI DEVICES

CROSS REFERENCE TO RELATED APPLICATIONS

The present application is the U.S. national stage application of international application PCT/EP2020/072964 filed Aug. 17, 2020, which international application was published on Mar. 11, 2021 as International Publication WO 2021/043565 A1. The international application claims priority to European Patent Application 19196004.6 filed Sep. 6, 2019.

FIELD OF THE INVENTION

The invention relates to an apparatus and method for controlling lighting control systems e.g. DALI devices in a DALI lighting system. The invention further relates to a system for commissioning the lighting control systems e.g. DALI devices.

BACKGROUND OF THE INVENTION

DALI stands for "Digital Addressable Lighting Interface". The DALI standard was developed for modern lighting systems.

Commissioning, which is the process of associating a physical position of an installed building technology device (e.g. a luminaire, sensor, window shade actuator, or controller) with a logical (e.g. bus or network) address, is an essential step during the installation and setup of an intelligent lighting system. The commissioning step typically requires electric, electronic and/or software expertise by the staff installing the light system and. This makes the installation costly due to the needed staff qualification. During the commissioning process, dedicated software or dedicated commissioning tools are used to assign an address and/or a geographical position to building technology devices. Afterwards, a grouping of the building technology devices (DALI group) and/or an association with a work flow definition, e.g. a scene definition, is performed.

The term "commissioning" is used generally to refer both to the programming of devices for dedicated behavior and to the programming for locating known devices in a community of networked devices.

Traditional commissioning methods consist of two phases. The first phase involves identifying a connected devices like a luminaire, sensor, actuator or controller to create a relation between a digital representation (DALI address) and the physical location where the device is located in a building relative to a floor plan or a hierarchy (e.g., Building→Floor→Room→Name). The second phase (configuration) involves defining behavior between the input and output devices, such as defining a group of lights to turn on/off based on a dedicated wall switch or the like, or adopt brightness and color temperature depending on time of day or ambient lighting detected from sensors.

SUMMARY OF THE INVENTION

The determination of the relation between the DALI address and the physical location and the configuration is complex.

It is an object of the present invention to provide an apparatus, a method and a system, with which configuration and/or commissioning of a lighting control systems e.g. DALI lighting system can easily be performed.

This object is achieved by an apparatus, a method and a system according to the enclosed independent claims. Advantageous features of the present invention are defined in the corresponding dependent claims.

According to the present invention, an apparatus for controlling DALI devices of a DALI lighting system comprises an interface for connecting the apparatus to a DALI-bus of said DALI lighting system, controlling means for detecting and addressing the DALI devices connected to the DALI-bus, storage means for storing addresses of the DALI devices generated by the controlling means and device type information of each DALI device detected by the controlling means and a Bluetooth transmitter for transmitting the addresses and the device type information to a mobile commissioning device and for receiving configuration information defining behavior of the DALI devices from the mobile commissioning device, wherein the controlling means is adapted to configure the DALI devices based on the configuration information.

With the present invention, in order to configure the DALI devices, the addresses and the device type information may easily be accessed on site by the mobile commissioning device having a Bluetooth interface, wherein the apparatus is a gateway that connects the mobile commissioning device communicating via Bluetooth to the DALI lighting system.

At least one of the DALI devices can be adapted to perform an operation for visually locating the DALI device by a user, wherein the Bluetooth transmitter is adapted to receive, from the mobile commissioning device, a command for visually localizing one of the DALI devices assigned to a certain address or for visually localizing the DALI devices assigned to a certain device type, the controlling means is adapted to generate a DALI control signal for performing said operation and to transmit, via the interface, the DALI control signal to the DALI device assigned to the certain address or to the DALI devices assigned to the certain device type.

Alternatively or in addition, at least one of the DALI devices can be adapted to generate an identification signal, when the DALI device is operated by a user to perform an identification operation, wherein the controlling means is adapted to receive, via the interface, the identification signal generated and transmitted by the DALI device and to control the Bluetooth transmitter to transmit, to the mobile commissioning device, the address assigned to the DALI device operated by the user.

According to the present invention, the system comprises the apparatus and the mobile commissioning device, wherein the mobile commissioning device comprises a graphical user interface and is configured to display a ground plan of the space, in which the DALI lighting system or parts of it is located, to generate icons of the DALI devices based on the addresses and the device type information received from the Bluetooth transmitter and to receive an input of a user of the mobile commissioning device on the graphical user interface to perform an operation of positioning of the generated icons in the ground plan to create a plan of the DALI lighting system. The user may draw a ground plan of the space (floorplan) on the graphical user interface and thereby define the design and layout of the ground plan of the space, e.g. by drawing it on the touchscreen of the a graphical user interface or by entering the size of the ground plan of the space, e.g. by entering a number of squares defining the length and width of the room whereas e.g. one squaremeter of the space could present one square.

The mobile commissioning device can be configured to receive, in the positioning operation, a first input of the user to mark the positions of the DALI devices in the ground plan or to display the preset positions of the DALI devices and a second input of the user to move the generated icons to the marked positions.

Alternatively or in addition, the mobile commissioning device can be configured to receive an input of the user on the graphical user interface to create the ground plan or to select the ground plan from stored plan templates.

Alternatively or in addition, the mobile commissioning device can be configured to receive an input of the user on the graphical user interface to select a generated icon and to start the operation for visually locating the DALI device that corresponds to the selected icon. The commissioning device is configured to determine the address of the DALI device that corresponds to the selected icon and to send the command together with the determined address to the Bluetooth transmitter.

Alternatively or in addition, the mobile commissioning device can be configured to receive an input of the user on the graphical user interface to define DALI group members by selecting respective icons displayed on the graphical user interface.

Alternatively or in addition, the mobile commissioning device can be configured to receive an input of the user on the graphical user interface to configure switches and/or sensors of the DALI devices.

Iteratively or in addition, the mobile commissioning device can be configured to generate the configuration information based on the defined DALI group members and the switch and/or sensor configuration.

Alternatively or in addition, the mobile commissioning device can be configured to acquire, from the apparatus, the configuration information stored in the apparatus' storage means, to receive an input of the user on the graphical user interface to modify the acquired configuration information and to overwrite the configuration information stored in the storage means by the modified configuration information.

Alternatively or in addition, the mobile commissioning device can be configured to display the ground plan on a grid, wherein each icon is positioned in an individual raster of the grid.

According to the present invention, the method for controlling DALI devices of a DALI lighting system, in which an apparatus is connected to a DALI-bus of said DALI lighting system via an interface of the apparatus and stores addresses of the DALI devices and device type information of each DALI device connected to a DALI-bus, comprises the steps of:
    transmitting, by a Bluetooth transmitter of the apparatus, the addresses and the device type information to a mobile commissioning device;
    receiving, by the Bluetooth transmitter, configuration information defining behavior of the DALI devices from the mobile commissioning device; and
    configuring, by the apparatus, the DALI devices based on the configuration information.

At least one of the DALI devices can be adapted to perform an operation for visually locating the DALI device by a user and the method further comprises the steps of:
    receiving, by the Bluetooth transmitter, from the mobile commissioning device, a command for visually localizing one of the DALI devices assigned to a certain address or for visually localizing the DALI devices assigned to a certain device type;
    generating, by the apparatus, a DALI control signal for performing said operation; and
    transmitting, by the apparatus via the interface, the DALI control signal to the DALI device assigned to the certain address or to the DALI devices assigned to the certain device type.

Alternatively or in addition, at least one of the DALI devices can be adapted to generate an identification signal, when DALI device is operated by a user to perform an identification operation, and the method further comprises the steps of:
    receiving, via the interface, the identification signal generated and transmitted by the DALI device; and
    transmitting, by the Bluetooth transmitter, to the mobile commissioning device, the address assigned to the DALI device operated by the user.

Alternatively or in addition, the mobile commissioning device can comprise a graphical user interface and the method further comprises the steps of:
    displaying, by the mobile commissioning device, a ground plan of the space, in which the DALI lighting system is located;
    generating, by the mobile commissioning device, icons of the DALI devices based on the addresses and the device type information received from the Bluetooth transmitter; and
    receiving, by the mobile commissioning device, an input of a user of the mobile commissioning device on the graphical user interface to perform an operation of positioning of the generated icons in the ground plan to create a plan of the DALI lighting system.

In the positioning operation, a first input of the user to mark the positions of the DALI devices in the ground plan or to display the preset positions of the DALI devices and a second input of the user to move the generated icons to the marked positions can be received by the mobile commissioning device.

Alternatively or in addition, the method can further comprise the step of receiving, by the mobile commissioning device, an input of the user on the graphical user interface to create the ground plan or to select the ground plan from stored plan templates.

Alternatively or in addition, the method can further comprise the steps of:
    receiving, by the mobile commissioning device, an input of the user on the graphical user interface to select a generated icon and to start the operation for visually locating the DALI device that corresponds to the selected icon;
    determining, by the mobile commissioning device, the address of the DALI device that corresponds to the selected icon; and
    transmitting, by the mobile commissioning device, the command together with the determined address to the Bluetooth transmitter.

BRIEF DESCRIPTION OF THE DRAWINGS

The invention will now be explained in more detail with reference to the accompanying drawings, wherein.

The same features are denoted by the same reference signs throughout all figures.

DETAILED DESCRIPTION

Figure 1:
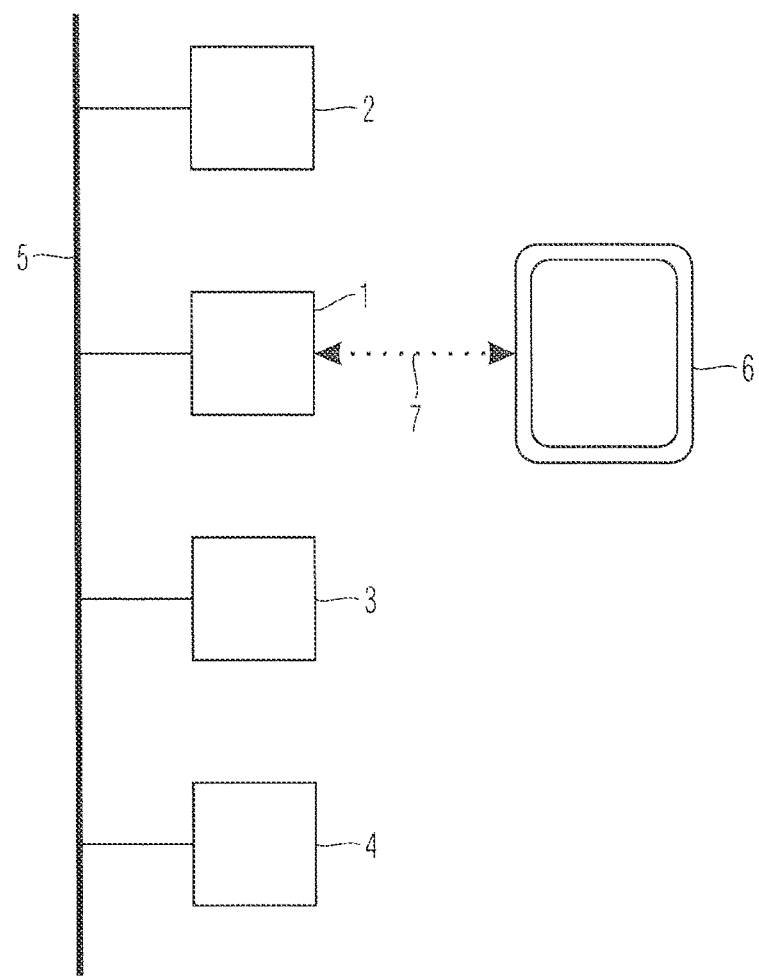
FIG. 1 shows a DALI lighting system according to an embodiment of the present invention.

FIG. 1 shows a DALI lighting system according to a first embodiment of the present invention. The DALI lighting system shown in FIG. 1 comprises a controlling apparatus 1, a luminaire 2, a presence sensor 3, a switch 4, a DALI-Bus 5, which connects the controlling apparatus 1, the luminaire 2, the presence sensor 3 and the switch 4 to each other, and a mobile commissioning device 6, which is adapted to communicate with the controlling apparatus 1 via a Bluetooth connection 7. Of course, additional devices may be comprised by the DALI lighting system.

The controlling apparatus 1 performs automatic DALI scanning for device changes and automatic DALI short addressing. In this way, the controlling apparatus 1 detects the luminaire 2, the presence sensor 3 and the switch 4 connected to the DALI-Bus 5 based on their production numbers and assigns an address to each of the luminaire 2, the presence sensor 3 and the switch 4. Further, the controlling apparatus 1 determines the device types (luminaire, presence sensor and switch) and stores the addresses and associates the device type information for each address.

Figure 2:
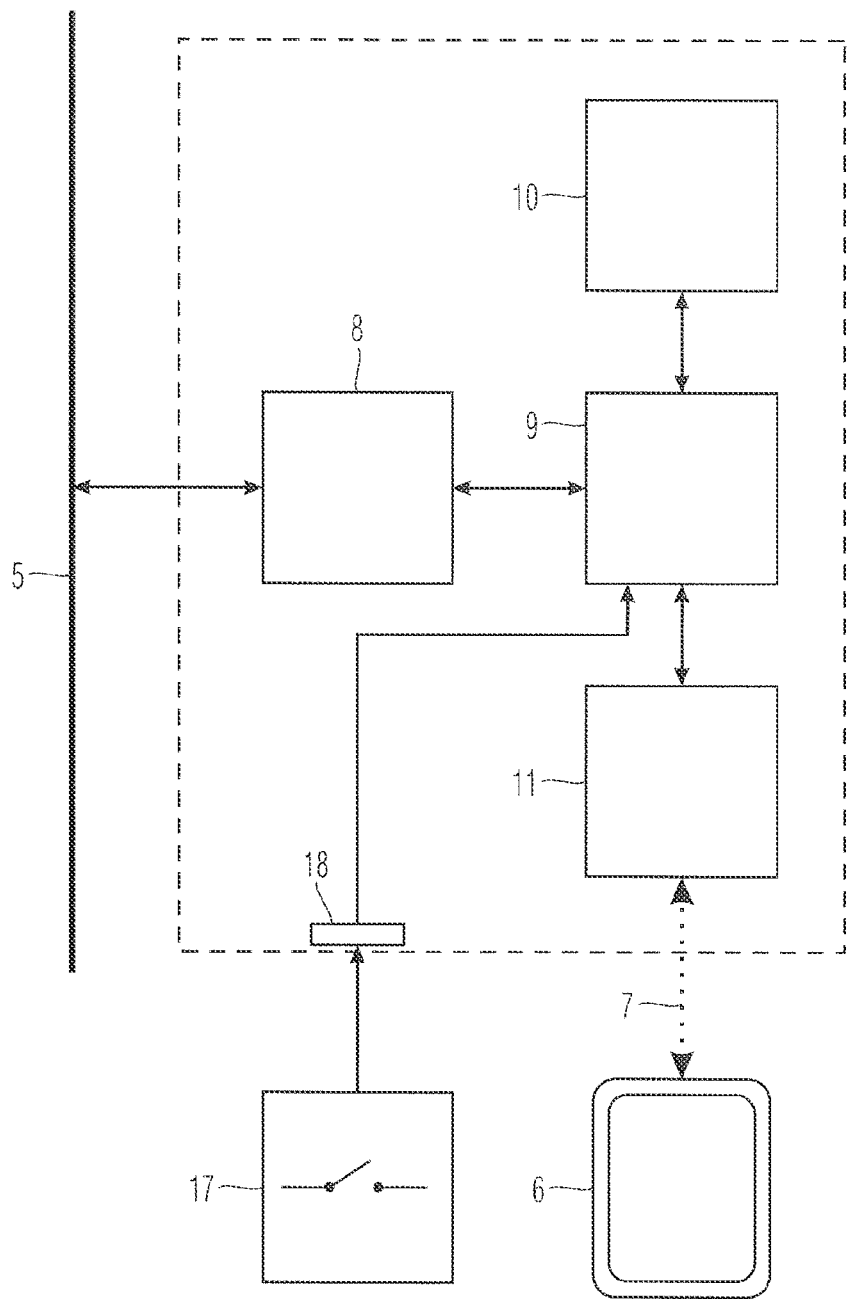
FIG. 2 shows the controlling apparatus of the DALI lighting system shown in FIG. 1, and FIG. 3 to FIG. 10 show screens on the display of the mobile commissioning device.

As shown in FIG. 2 the controlling apparatus 1 comprises an interface 8 for connecting the apparatus 1 to the DALI-bus 5, a controlling means 9 for detecting and addressing the luminaire 2, the presences sensor 3 and the switch 4 connected to the DALI-bus 5, a storage means 10 (nonvolatile memory) for storing the addresses and the device type information and a Bluetooth transmitter 11 for transmitting the addresses and the device type information to the mobile commissioning device 6 and for receiving configuration information from the mobile commissioning device 6. The controlling means 9 is adapted to configure to the DALI devices based on the configuration information.

The controlling means 9 may forward the information received from the mobile commissioning device 6 over Bluetooth as e.g. configuration information or operation information as e.g. dimming levels to the DALI-bus 5. The controlling means 9 may encode the information received from the mobile commissioning device 6 over Bluetooth onto the DALI-bus 5 by encoding it into DALI-bus commands, e.g. by Consistent Overhead Byte Stuffing. Consistent Overhead Byte Stuffing (COBS) is an algorithm for encoding data bytes that results in efficient, reliable, unambiguous packet framing regardless of packet content, thus making it easy for receiving applications to recover from malformed packets.

In a preferred embodiment the communication over Bluetooth is according to a defined standard. Such compatibility according to a standard enables the option that mobile devices to communicate via a standard Bluetooth protocol and to provide for instance control instructions to the controlling apparatus 1 in order to control devices on the DALI-bus 5 e.g. to switch them on or off or to dim them.

The controlling apparatus 1 may further comprise an interface 18 for connection of a manual operation device like a switch 17. The controlling apparatus 1 may read out an activation of the manual operation device and may control the DALI devices accordingly, e.g. switch on or off or dim the light sources.

The mobile commissioning device 6, such as a tablet, laptop or smart phone and in general any device capable of executing an application and connecting to other devices via a Bluetooth connection, can be wirelessly connected to the internet. It includes a graphical user interface and a software application configured to assist in identifying the location of connected physical DALI devices (the luminaire 2, the presence sensor 3 and the switch 4) on the ground plan of a room, where the DALI lighting system is located. The ground plan of the room can be generated by the user on the mobile commissioning device 6 or the user selects a template from a ground plan data base stored in the mobile commissioning device 6.

Figure 3:
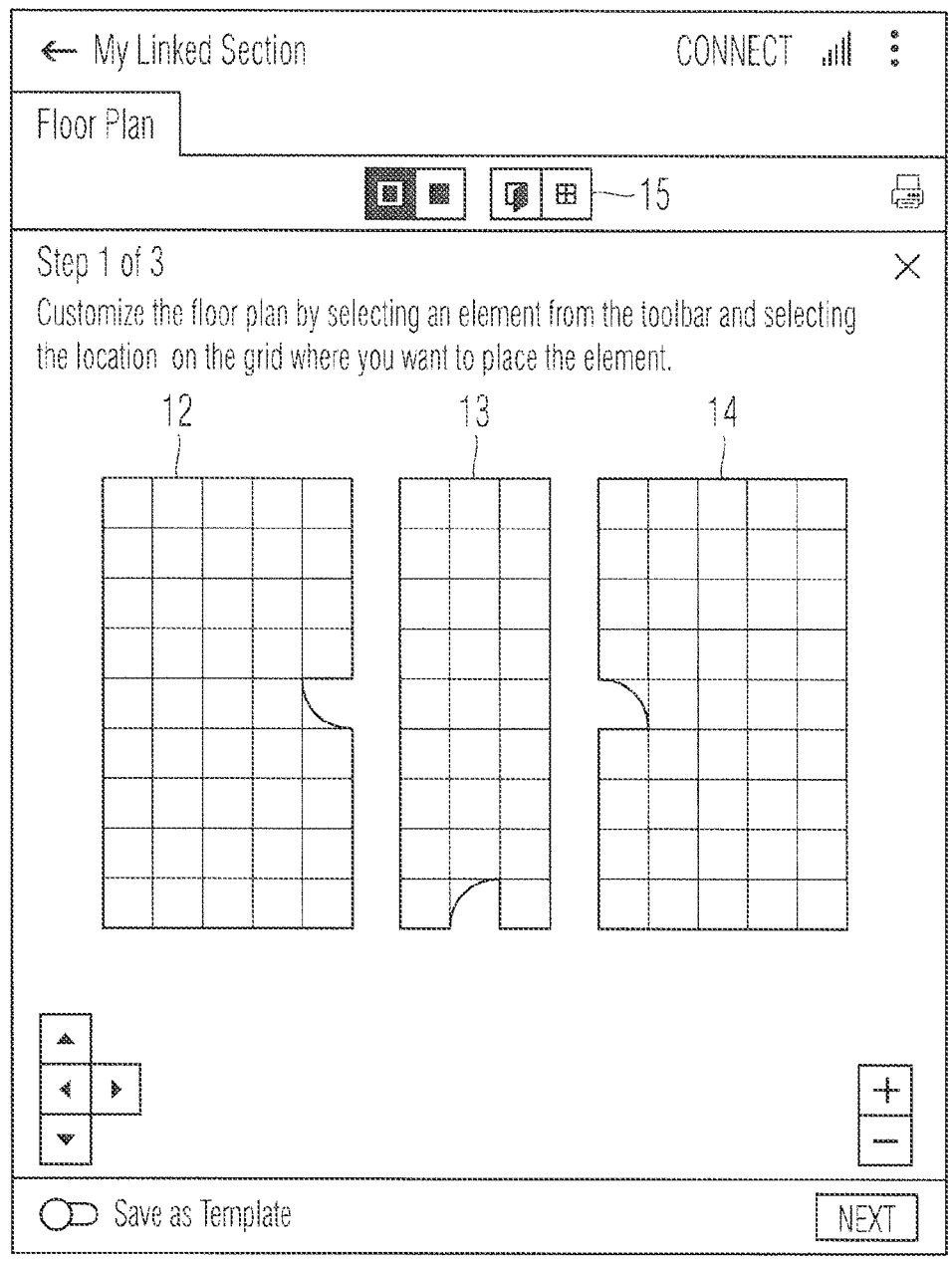

FIG. 3 shows a screen on the display of the mobile commissioning device 6 with an exemplary floor plan consisting of a first room 12, a second room 13, and a third room 14 and a first toolbar 15. Each room is overlayed with a grid to align elements and is customized by drag and drop operation, in which elements like doors or windows are selected from the first toolbar 15 and positioned on the desired location/square on the grid.

The mobile commissioning device 6 additionally generates an icon for each physical device of the DALI lighting system based on address and device type information received from the control apparatus 1 and displays the generated icons in a second toolbar (not shown), wherein the icon indicates the device type. In a drag and drop operation by the user these icons are placed in the correct position on the grid.

In order to determine the correct position and the correct icon, the mobile commissioning device 6 can initiate an operation for visually locating the DALI device by a user. In the operation, the DALI device illuminates, when the DALI device is a luminaire, or a control lamp (indicator LED) of the DALI device illuminates, when the DALI device is a sensor, so that the user can locate a DALI device that corresponds to a selected icon.

In order to determine the position of a DALI device like a switch or control panel having no light source included the mobile commissioning device 6 can visually indicate the relevant DALI device by optical indication e.g. shaking or wiggling of the respective icon on the graphical user interface when the DALI device is activated. E.g. if DALI-bus switch is pressed its respective icon can shake or wiggle on the graphical user interface that the user can identify the activated DALI device on the graphical user interface. In order to achieve such operation the controlling means 9 reads out the respective DALI address of the activated DALI device from the DALI-bus 5 and enables optical indication e.g. wiggling or shaking of the respective icon linked to the addressed DALI device.

In order to initiate the operation, the user selects a desired icon on the screen and the mobile commissioning device 6 determines the address of the DALI device that corresponds to the selected icon and sends the command for visual localizing together with the determined address to the Bluetooth transmitter 11. The controlling means 9 generates a DALI control signal for performing the operation based on the received command and transmits, via the interface 8, the DALI control signal to the DALI device assigned to the address, which performs the operation.

When the DALI device is a switch, typically having no indictor LED, the user can operate the switch to initiate an identification operation, wherein the switch generates and sends an identification signal on the DALI bus 5. The controlling means 9 receives, via the interface, the identification signal and controls the Bluetooth transmitter 11 to transmit, to the mobile commissioning device 6, the address assigned to the switch operated by the user. The mobile commissioning device 6 determines the generated icon in the second toolbar that corresponds to the switch and displays the determined icon or, when a plurality of icons are displayed, the determined icon is highlighted.

Figure 4:
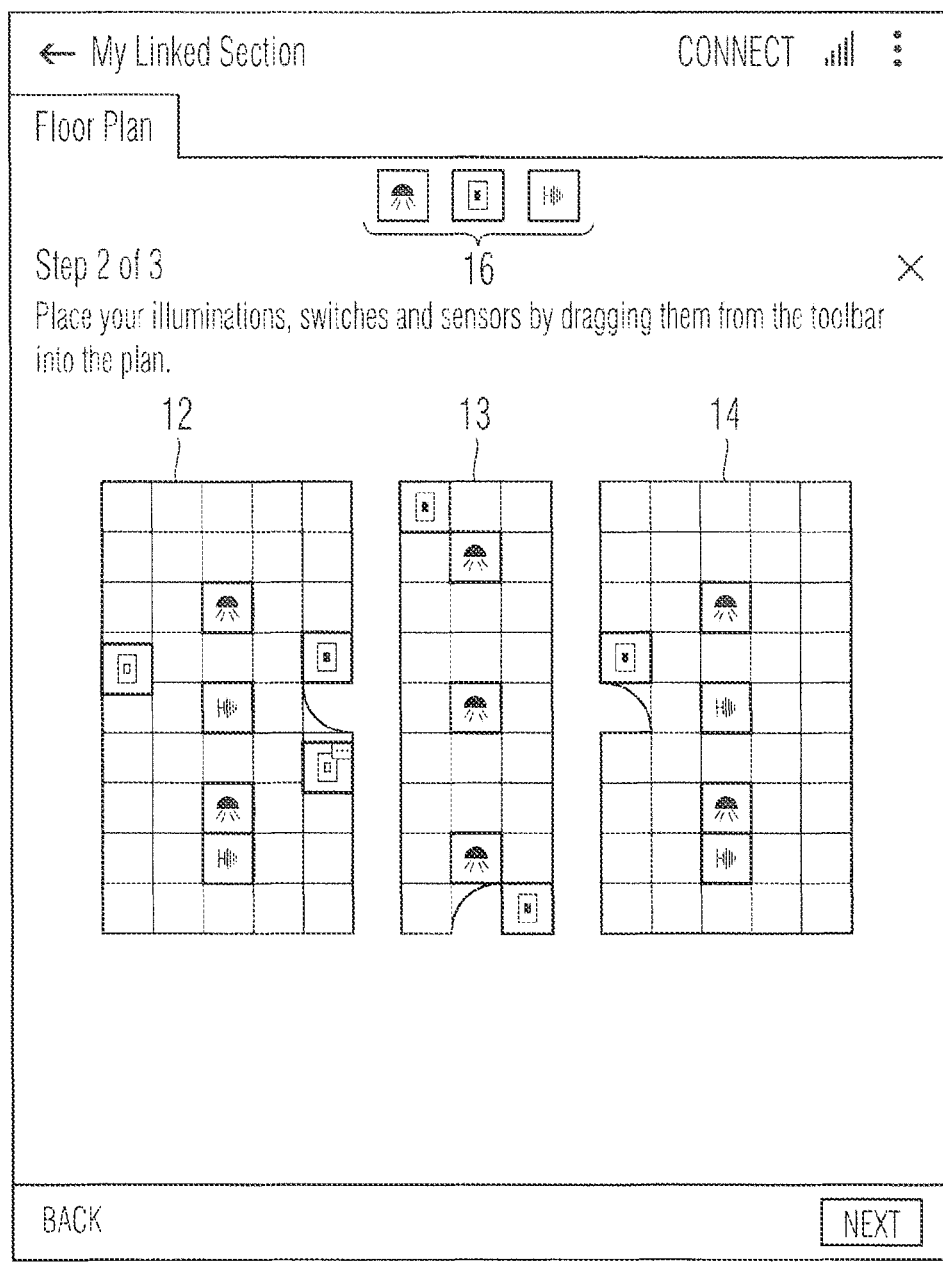

As described the icons can be positioned in a drag and drop operation. Alternatively, in a first step, the positions, on which the icons are to be placed, can be marked in the grid or a template. As shown in FIG. 4, general icons from a third toolbar 16 for the different types of physical devices are used to mark the position for luminaires, switches and sensors in the room. In a second step, icons of the second toolbar are placed on the preselected/marked positions. In this way the user can easily place the specific icons in the correct position.

Figure 5:
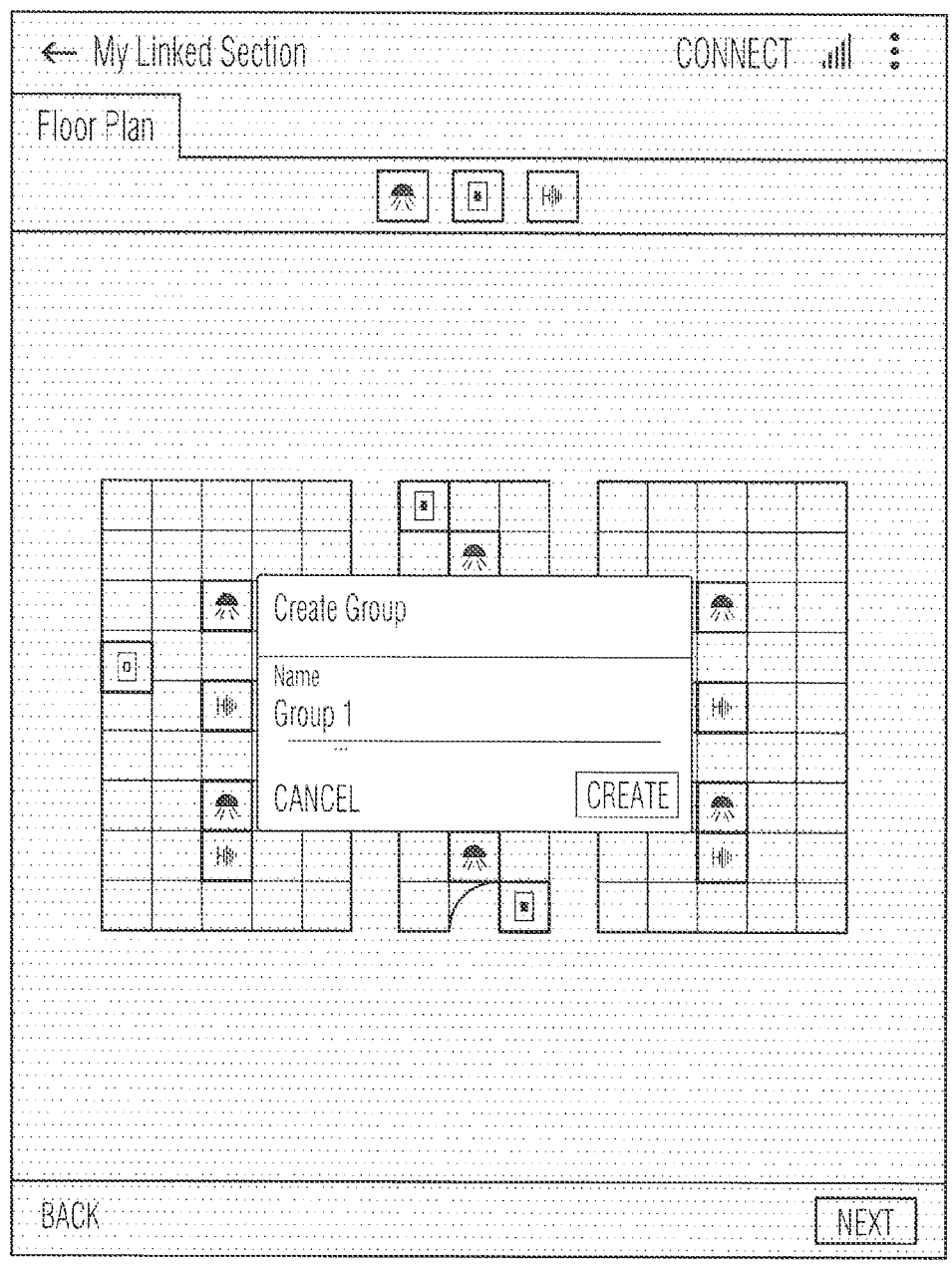
Figure 6:
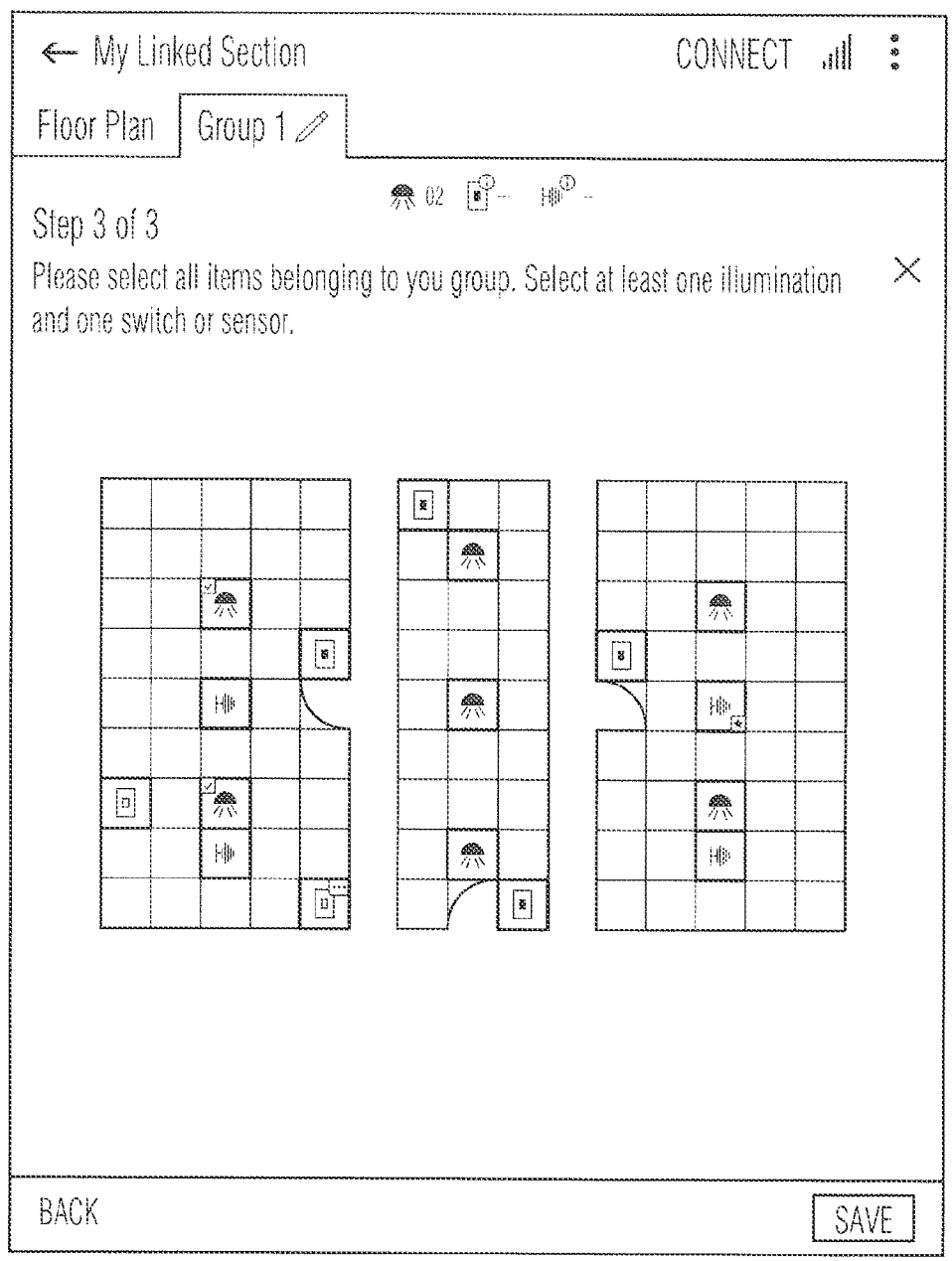

FIG. 5 and FIG. 6 show screens to create a DALI group, wherein in FIG. 5 a group name is assigned, and in FIG. 6 devices belonging to the group are defined by selecting the respective icons by user.

Figure 7:
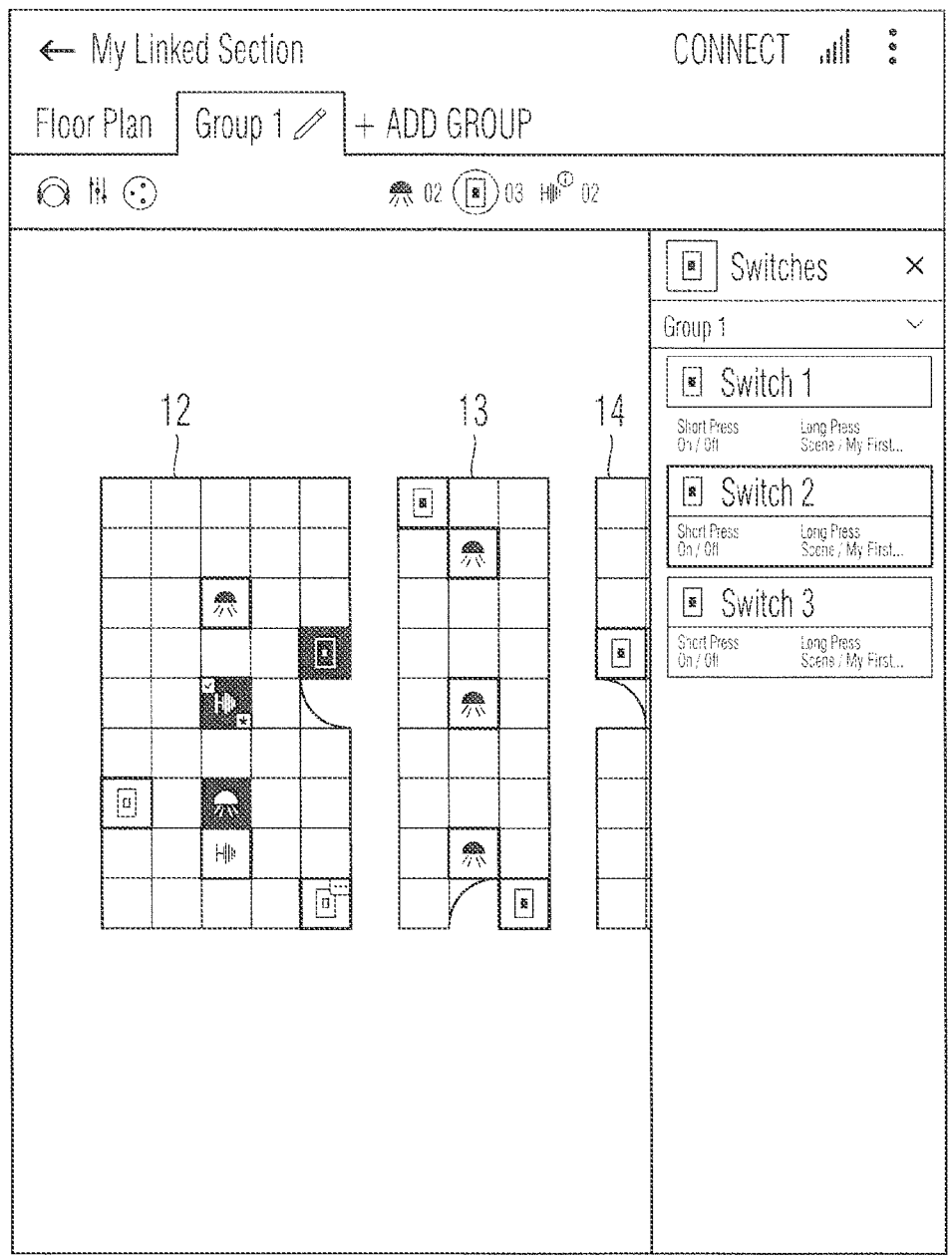
Figure 8:
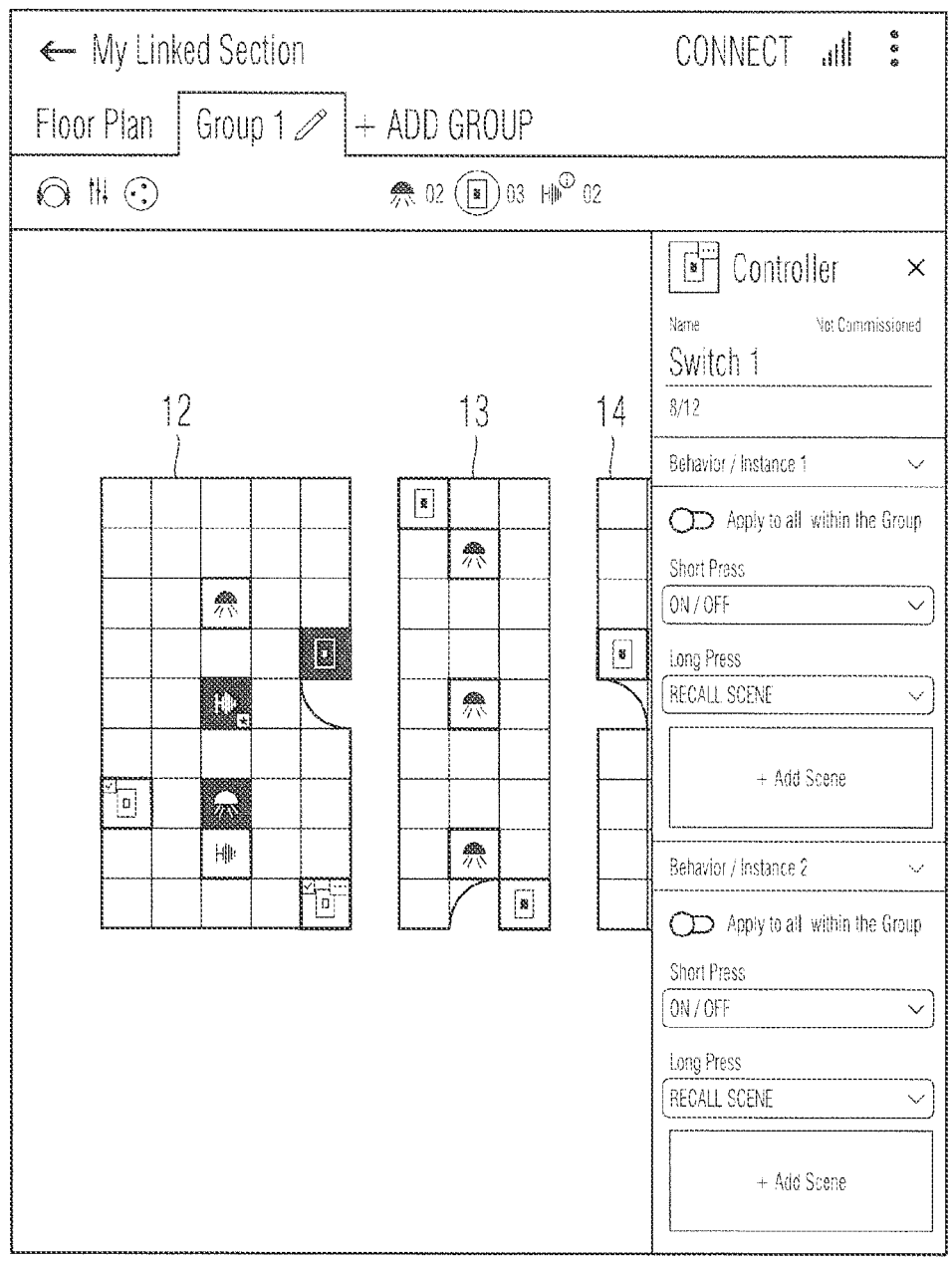

FIG. 7 and FIG. 8 show screens for selecting a switch and configuring the selected switch, respectively.

Figure 9:
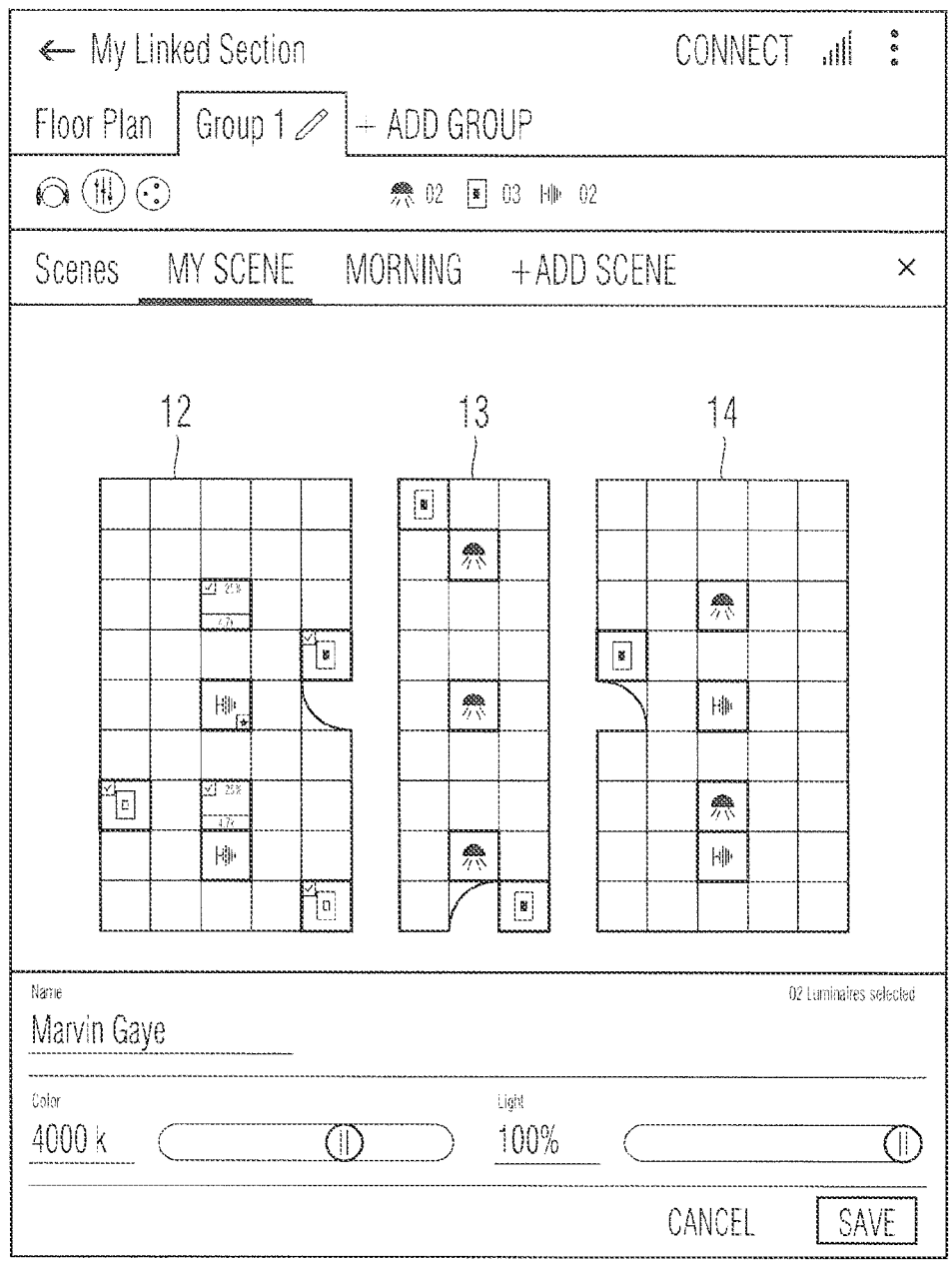

FIG. 9 shows a screen for programming a DALI scene.

Figure 10:
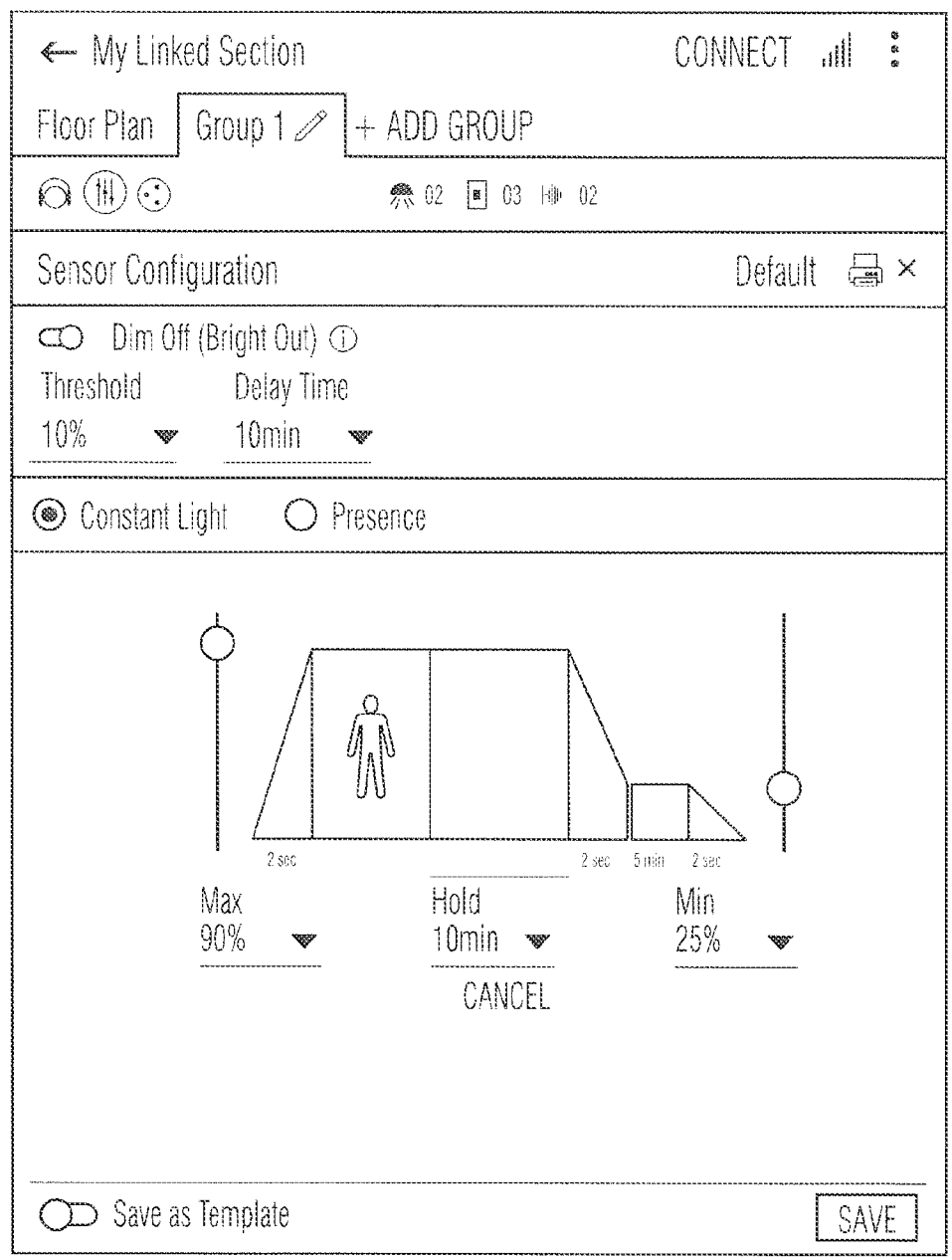

In FIG. 10 a screen for sensor configuration is shown.

The mobile commissioning device 6 generates the configuration information based on the defined DALI group members and the switch and sensor configuration and sends the generated configuration information to the Bluetooth transmitter 11.

Bevor the second toolbar, showing all devices whose address is already stored in a database of the controlling apparatus 1, can be displayed, the controlling apparatus needs to be connected via Bluetooth to the commissioning device 6. In case that a plurality of such controlling apparatuses is included in the DALI system, at first, all available Bluetooth devices are displayed on the commissioning device 6. An input operation of one of the displayed controlling apparatuses 1 will trigger a response of all devices whose addresses are registered in the database included in the respective controlling apparatus 1. This allows identifying and connecting to a specific controlling apparatus 1.

The terms "locating" and "localizing" should be understood synonymously, as both describe a local determination.

The invention may related to lighting control systems in general. One preferred example is the implementation of a DALI lighting system.

What is claimed is:

1. An apparatus for controlling DALI devices of a DALI lighting system, comprising
  an interface for connecting the apparatus to a DALI-bus of said DALI lighting system;
  a controller configured to detect and address the DALI devices connected to the DALI-bus and to determine device type information of each DALI device;
  storage means for storing addresses of the DALI devices generated by the controlling means and device type information of each DALI device detected by the controlling means; and
  Bluetooth transmitter for transmitting the addresses and the device type information to a mobile commissioning device and for receiving configuration information defining behavior of the DALI devices from the mobile commissioning device, wherein
  the controller is adapted to configure the DALI devices based on the configuration information;
  wherein at least one of the DALI devices is adapted to generate an identification signal when operated by a user to perform an identification operation;
  the controller is adapted to receive, via the interface, the identification signal generated and transmitted by the DALI device operated by the user to perform the identification operation and to control the Bluetooth transmitter to transmit to the mobile commissioning device the address assigned to the DALI device operated by the user to perform the identification operation; and
  the mobile commissioning device has a graphical user interface that provides an optical indication that the identification operation has been performed by the user for said DALI device in response to receiving the address assigned to the DALI device operated by the user to perform the identification operation.

2. The apparatus according to claim 1, wherein
  at least one of the DALI devices is adapted to perform an operation for visual locating the DALI device by a user so that the user can locate the DALI device;
  the Bluetooth transmitter is adapted to receive, from the mobile commissioning device, a command for visual locating one of the DALI devices assigned to a certain address or for visual localizing the DALI devices assigned to a certain device type;
  the controller is adapted to generate a DALI control signal for performing said operation and to transmit, via the interface, the DALI control signal to the DALI device assigned to the certain address or to the DALI devices assigned to the certain device type.

3. The system according to claim 2, wherein
  the mobile commissioning device is configured to receive an input of the user on a graphical user interface to select a generated icon and to start the operation for visual locating the DALI device that corresponds to the selected icon, and the mobile commissioning device is configured to determine the address of the DALI device that corresponds to the selected icon and to send the command together with the determined address to the Bluetooth transmitter.

4. A system comprising an apparatus according to claim 1 and the mobile commissioning device, wherein
  the mobile commissioning device comprises a graphical user interface and is configured to display a ground plan of the space, in which the DALI lighting system is located;
  generate icons of the DALI devices based on the addresses and the device type information received from the Bluetooth transmitter; and
  receive an input of a user of the mobile commissioning device on the graphical user interface to perform an operation of positioning of the generated icons in the ground plan to create a plan of the DALI lighting system.

5. The system according to claim 4, wherein
  the mobile commissioning device is configured to receive, in positioning operation, a first input of the user to mark the positions of the DALI devices in the ground plan or to display the preset positions of the DALI devices and a second input of the user to move the generated icons to the marked the positions.

6. The system according to claim 4, wherein
  the mobile commissioning device is configured to receive an input of the user on the graphical user interface to create the ground plan or to select the ground plan from stored plan templates.

7. The system according to claim 4, wherein
  the mobile commissioning device is configured to receive an input of the user on the graphical user interface to define DALI group members by selecting respective icons displayed on the graphical user interface.

8. The system according to claim 7, wherein
the mobile commissioning device is configured to generate the configuration information based on the defined DALI group members and the switch and/or sensor configuration.

9. The system according to claim 4, wherein
the mobile commissioning device is configured to receive an input of the user on the graphical user interface to configure switches and/or sensors of the DALI devices.

10. The system according to claim 4, wherein
the mobile commissioning device is configured to acquire, from the apparatus, the configuration information stored in the storage means, to receive an input of the user on the graphical user interface to modify the acquired configuration information and to overwrite the configuration information stored in the storage means by the modified configuration information.

11. The system according to claim 4, wherein
the mobile commissioning device is configured to display the ground plan on a grid, wherein each icon is positioned in an individual raster of the grid.

12. The apparatus according to claim 1 further comprising: an interface for the connection of a manual operation device, wherein the controller reads out activation of the manual operation device and controls DALI devices accordingly.

13. A method for controlling DALI devices of a DALI lighting system, in which an apparatus is connected to a DALI-bus of said DALI lighting system via an interface of the apparatus and stores addresses of the DALI devices and device type information of each DALI device connected to a DALI-bus, wherein the method comprises the steps of:
transmitting, by a Bluetooth transmitter of the apparatus, the addresses and the device type information to a mobile commissioning device;
receiving, by the Bluetooth transmitter, configuration information defining behavior of the DALI devices from the mobile commissioning device; and
configuring, by the apparatus, the DALI devices based on the configuration information;
wherein at least one of the DALI devices is adapted to generate an identification signal, when DALI device is operated by a user to perform an identification operation, and the method further comprises the steps of:
receiving, via the interface, the identification signal generated and transmitted by the DALI device; and
transmitting, by the Bluetooth transmitter, to the mobile commissioning device, the address assigned to the DALI device operated by the user;
providing an optical indication on a graphical user interface of the mobile commissioning device that the identification operation has been performed by the user for said DALI device in response to receiving the address assigned to the DALI device operated by the user to perform the identification operation.

14. The method according to claim 13, wherein
at least one of the DALI devices is adapted to perform an operation for visual locating the DALI device by a user so that the user can locate the DALI device and the method further comprises the steps of:
receiving, by the Bluetooth transmitter, from the mobile commissioning device, a command for visual locating one of the DALI devices assigned to a certain address or for visual localizing the DALI devices assigned to a certain device type;
generating, by the apparatus, a DALI control signal for performing said operation; and
transmitting, by the apparatus via the interface, the DALI control signal to the DALI device assigned to the certain address or to the DALI devices assigned to the certain device type.

15. The method according to claim 13, wherein
the mobile commissioning device comprises a graphical user interface and the method further comprises the steps of:
displaying, by the mobile commissioning device, a ground plan of the space, in which the DALI lighting system is located;
generating, by the mobile commissioning device, icons of the DALI devices based on the addresses and the device type information received from the Bluetooth transmitter; and
receiving, by the mobile commissioning device, an input of a user of the mobile commissioning device on the graphical user interface to perform an operation of positioning of the generated icons in the ground plan to create a plan of the DALI lighting system.

16. The method according to claim 15, wherein
in the positioning operation, a first input of the user to mark the positions of the DALI devices in the ground plan or to display the preset positions of the DALI devices and a second input of the user to move the generated icons to the marked the positions are received by the mobile commissioning device.

17. The method according to claim 13, wherein the method further comprises the step of:
receiving, by the mobile commissioning device, an input of the user on the graphical user interface to create the ground plan or to select the ground plan from stored plan templates.

18. The method according to claim 13, wherein the method further comprises the steps of:
receiving, by the mobile commissioning device, an input of the user on the graphical user interface to select a generated icon and to start the operation for visual locating the DALI device that corresponds to the selected icon;
determining, by the mobile commissioning device, the address of the DALI device that corresponds to the selected icon; and
transmitting, by the mobile commissioning device, the command together with the determined address to the Bluetooth transmitter.

* * * * *